R. F. HERPOLSHEIMER.
LIQUID CLUTCH.
APPLICATION FILED FEB. 4, 1914.

1,107,944.

Patented Aug. 18, 1914.

2 SHEETS—SHEET 1.

Witnesses

R. F. Herpolsheimer, Inventor by C. A. Snow & Co.

Attorneys

R. F. HERPOLSHEIMER.
LIQUID CLUTCH.
APPLICATION FILED FEB. 4, 1914.
1,107,944.
Patented Aug. 18, 1914.
2 SHEETS—SHEET 2.
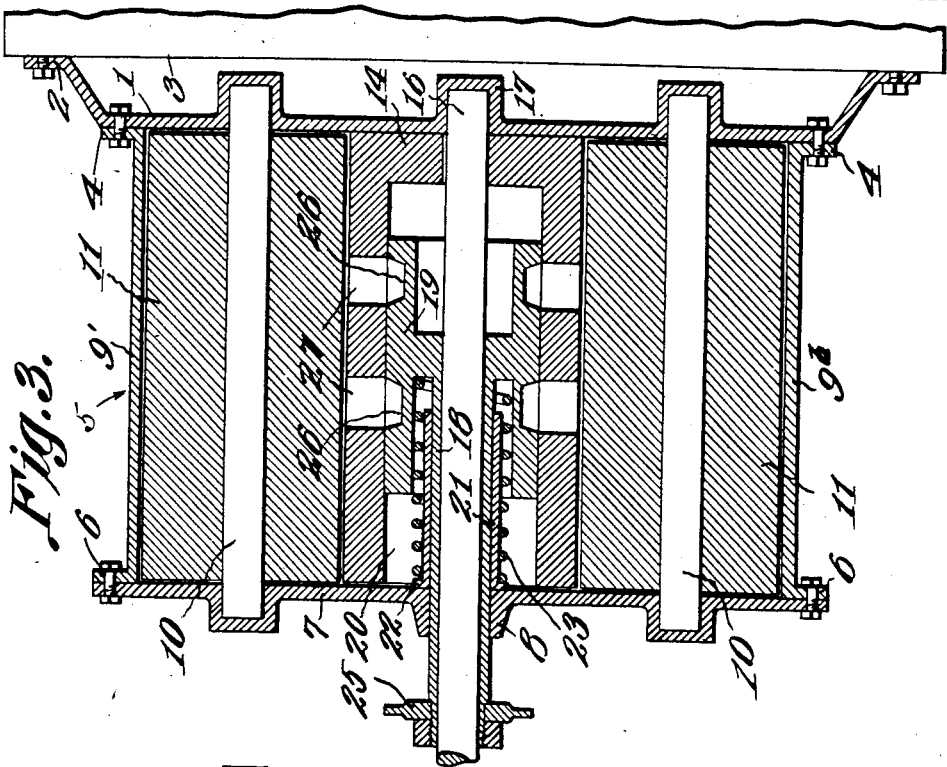
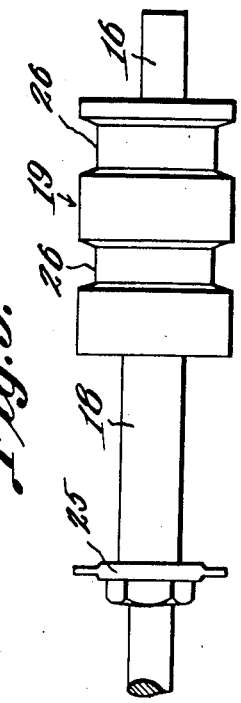
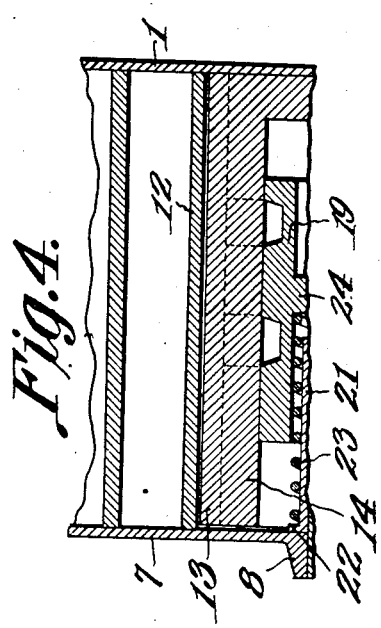
R. F. Herpolsheimer,
Inventor
by C. A. Snow & Co.
Attorneys
Witnesses

UNITED STATES PATENT OFFICE.

RUDOLPH F. HERPOLSHEIMER, OF CHICAGO, ILLINOIS.

LIQUID-CLUTCH.

1,107,944.   Specification of Letters Patent.   Patented Aug. 18, 1914.

Application filed February 4, 1914. Serial No. 816,562.

*To all whom it may concern:*

Be it known that I, RUDOLPH F. HERPOLSHEIMER, a citizen of the United States, residing at Chicago, in the county of Cook and State of Illinois, have invented a new and useful Liquid-Clutch, of which the following is a specification.

The present invention relates to improvements in fluid clutches, one object of the present invention being the provision of a mechanism of this character in which the principle of a gear rotary pump is employed to produce the desired variable and reversible effect for transmitting power from a driving to a driven element, there being provided novel means for controlling the circulation of the fluid within the clutch and consequently the speed at which the driven element is operated from the driving element and also whereby the driven element is permitted to be inert when the driving element is operating.

A still further object of the present invention is the provision of a fluid clutch which is adapted to be used in connection with explosive or other engines, either upon automobiles or other mechanisms where it is desired to transmit a variable power and speed, and without any intermittent changing as is the case with gear or planetary clutches.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 2:
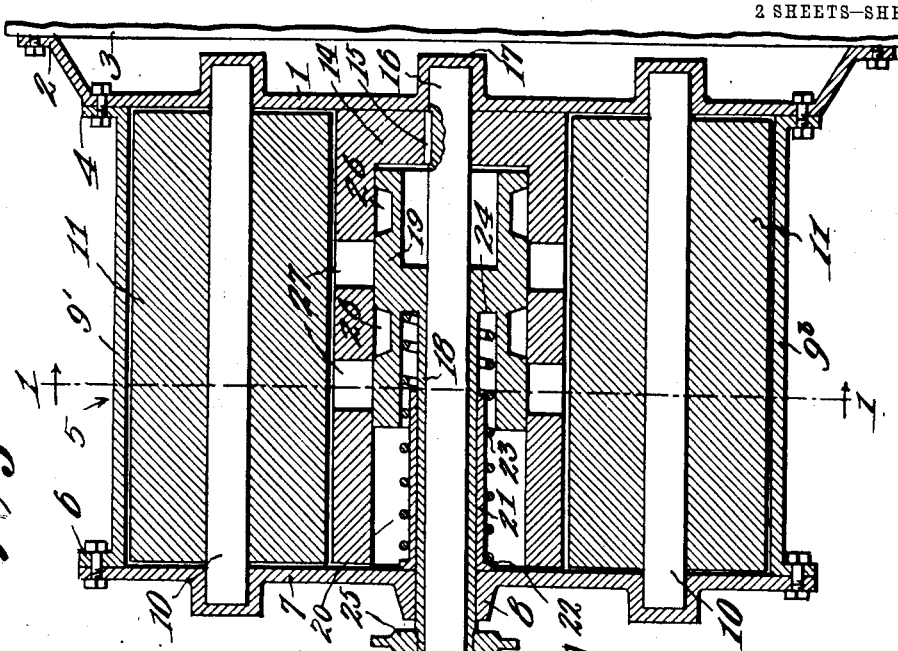
Figure 1:
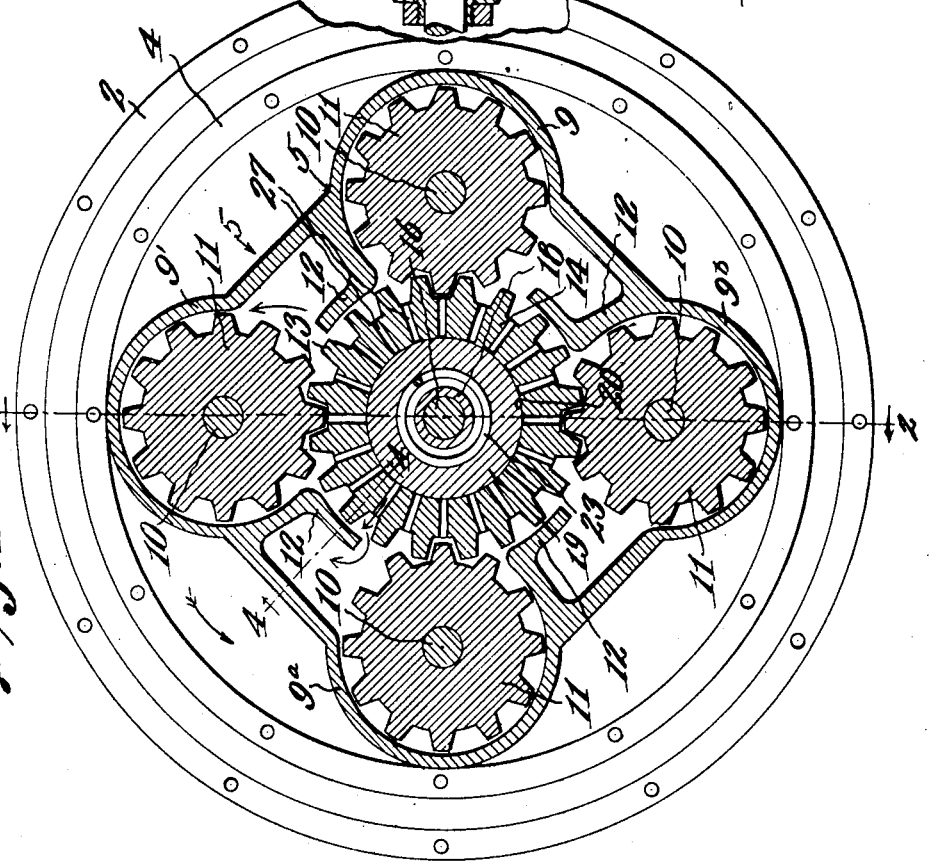

In the drawings—Figure 1 is a cross section taken on line 1—1 of Fig. 2 of the clutch. Fig. 2 is a section taken on line 2—2 of Fig. 1 showing the elements in the position for transmitting power. Fig. 3 is a similar view showing the parts in the position they assume when the driving portion of the clutch is operating without actuating the driven element thereof. Fig. 4 is a section taken on line 4—4 of Fig. 1. Fig. 5 is a plan view of the fluid circulating controlling member and the driven shaft.

Referring to the drawings, the numeral 1 designates one head of the clutch casing whose flange 2 is connected to the face 3 of a fly wheel of an explosive engine. This head 1 may be connected by any other means to the driving element but is here shown as connected directly to the fly wheel. The flange 4 of the carrying casing 5 is connected to the head 1 and has its flange 6 connected to the opposite head 7, which is provided with the concentric sleeve or bearing 8, the purpose of which will presently appear.

The casing 5, as clearly illustrated in Fig. 1, is provided with four longitudinally disposed cylindrical enlargements 9, 9', 9ª and 9ᵇ and journaled in the axial center thereof and having the respective ends thereof mounted for rotation in the heads 1 and 7 of the casing are the four shafts 10 which have rotatably mounted thereon, the longitudinally disposed gears 11. Formed integral with the reduced portion of the casing 5 between each one of the gear carrying portions thereof, are the right angled shaped lips 12, which in cross section with the adjacent portion of the casing constitutes a substantially U-shaped longitudinally disposed receptacle for the fluid, which is preferably oil.

As illustrated by the tailed arrow in Fig. 1, as the casing 5 is rotated counter-clockwise, the liquid within the receptacle 12 on line 4—4 of Fig. 1 will follow the line of the arrows therein indicated and spill between the periphery of the gear 10 in the receptacle 9ª and the teeth 13 of the main centrally disposed gear 14. The gear 14 is hollowed to provide a chamber 20 at one end, and has its solid head keyed at 15 to the shaft 16, which shaft 16 is the driven shaft of the present mechanism and has one end journaled in the socket 17 of the head 1 of the casing while the opposite end is extended through the bearing 18 and out of contact therewith to the mechanism operated by such shaft. Mounted within the chamber 20 of the gear 14 for longitudinal sliding movement is the valve member 19 which is a cylindrical member and is provided with the sleeve 18 which surrounds the shaft 16 and is operable exteriorly for reciprocating the valve 19 by means of the yoke 25. This yoke, as is usual, is adapted to be operated by hand or other means so that the valve 19 is moved to and from the positions as shown in Figs. 2 and 3. A sleeve 21 surrounds the sleeve 18 so that its rim 22 abuts the inner face of the head 7, a spring 23 being disposed upon the sleeve 21 and exerting a tension upon the rim 22 and the partition 24 of the valve 19 to normally hold it in the full clutched position, as shown in Fig. 2. Thus in order to hold the clutch in a free running position as shown in Fig. 3, the yoke 25 is operated upon to pull the sleeve 18 outwardly so as to place the circumferential circulating channels 26 of the valve 19 into full alinement with the respective perforations or slots 27 formed through the gear member 14 in the space between the respective teeth 13 thereof as particularly illustrated in Figs. 1 and 2.

From the foregoing description taken in connection with the drawings, it is evident that when the parts are in the position as shown in Fig. 3, the fly wheel 3 rotating will cause the rotation of the casing 5 and consequently the gear 11 around the gear 14, and as the liquid within the casing is permitted a free circulation, the clutch will run free without transmitting power to the shaft 16. By moving the valve 19 gradually from the position as shown in Fig. 3, to the position as shown in Fig. 2, and gradually placing the peripheral grooves 26 out of alinement with the slots or perforations 27, the circulation of the liquid within the casing 5 is stopped gradually, and gradually motion is imparted from the casing 5 and gears 11 to the gear 14 and consequently to the shaft 16. When the valve 19 has assumed the position as shown in Fig. 2, with the circumferential grooves 26 completely out of alinement with the slots or perforations 27, it being impossible for the liquid to now circulate, the clutch members will be connected directly and the casing 5 will impart the desired rotation to the driven shaft 16.

When the parts are running freely as illustrated in Fig. 3, and by the arrows in Fig. 1, the fluid will be caused to pass from one receptacle 12 into the casing 9′ therearound emptying through the respective ports 27 of the gear 14 and through the channel 26 will enter another port 27 and into the next succeeding reservoir 12 to follow this cycle of operation during the rotation of the casing 5. It will therefore be seen that as soon as the ports 27 are closed by the valve 19 that such circulation of the fluid will be stopped and that therefore power will be transmitted from the casing 5 to the shaft 16. The reservoirs 12 insure the proper direction of the liquid so that it will enter into the respective chambers 9, 9′, 9ª and 9ᵇ and thereby insure the proper circulation of the liquid around and through the casing 5.

What is claimed is:

1. A liquid clutch, including a casing constituting the driving member, a driven member, a gear mounted in the casing and fast to the driven member, a plurality of freely rotatable gears carried by the casing, said gears meshing with the first gear, and means carried by the first gear for regulating the circulation of the liquid within the casing and about the gears.

2. A liquid clutch, including a casing constituting the driving member, a driven member, a gear mounted in the casing and fast to the driven member, a plurality of freely rotatable gears carried by the casing, said gears meshing with the first gear, and manually operated means carried by the first gear for regulating the circulation of the liquid within the casing and about the gears.

3. A liquid clutch, including a casing constituting the driving member, a driven member, a gear mounted in the casing and fast to the driven member, a plurality of freely rotatable gears carried by the casing, said gears meshing with the first gear, said first gear being hollow and having a plurality of ports therethrough, whereby the liquid within the casing and about the plurality of gears has free access or circulation through the first gear, and means mounted in the hollow portion of the first gear for controlling the ports thereof and the circulation of the liquid and whereby the driven member is operated by the driving member.

4. A liquid clutch, including a casing constituting the driving member, a driven member, a gear mounted in the casing and fast to the driven member, a plurality of freely rotatable gears carried by the casing, said gears meshing with the first gear, said first gear being hollow and having a plurality of ports therethrough, whereby the liquid within the casing and about the plurality of gears has free access of circulation through the first gear, and a plunger valve mounted for reciprocation within the hollow portion of the first gear for controlling the ports and the circulation of the liquid.

5. A liquid clutch, including a casing constituting the driving member, a driven member, a gear mounted in the casing and fast to the driven member, a plurality of freely rotatable gears carried by the casing, said gears meshing with the first gear, said first gear being hollow and having a plurality of ports therethrough, whereby the liquid within the casing and about the plurality of gears has free access of circulation through the first gear, a plurality of longitudinally disposed liquid receptacles carried by the casing one to each of the plurality of gears, said receptacles being disposed to direct the liquid to the periphery and against the outer wall of the casing as the driving member is rotated, and manually operable means slidably mounted within the hollow portion of the first gear for controlling the ports and the circulation of the liquid throughout the casing.

6. A liquid clutch, including a casing constituting the driving member, a driven member, a gear mounted in the casing and fast to the driven member, a plurality of freely rotatable gears carried by the casing, said gears meshing with the first gear, said first gear being hollow and having a plurality of ports therethrough, whereby the liquid within the casing and about the plurality of gears has free access of circulation through the first gear, a plurality of longitudinally disposed liquid receptacles carried by the casing one to each of the plurality of gears, said receptacles being disposed to direct the liquid to the periphery and against the outer wall of the casing as the driving member is rotated, a valve slidably mounted in the hollow portion of the first gear and provided with port controlling means, and a manually operable means connected to the valve and operable exterior of the casing for sliding the valve to control the ports of the first gear and the circulation of the liquid.

In testimony that I claim the foregoing as my own, I have hereto affixed my signature in the presence of two witnesses.

RUDOLPH F. HERPOLSHEIMER.

Witnesses:
MARTIN MILISZ,
ELVIRA M. A. ANDERSON.